US010496712B2

(12) United States Patent
Nagata

(10) Patent No.: US 10,496,712 B2
(45) Date of Patent: Dec. 3, 2019

(54) EQUIPMENT INFORMATION ACQUISITION DEVICE, EQUIPMENT INFORMATION ACQUISITION SYSTEM, EQUIPMENT INFORMATION ACQUISITION METHOD, AND INFORMATION STORAGE MEDIUM

(71) Applicant: Kabushiki Kaisha Yaskawa Denki, Kitakyushu-shi (JP)

(72) Inventor: Takeshi Nagata, Kitakyushu (JP)

(73) Assignee: KABUSHIKI KAISHA YASKAWA DENKI, Fukuoka (JP)

(*) Notice: Subject to any disclaimer, the term of this patent is extended or adjusted under 35 U.S.C. 154(b) by 338 days.

(21) Appl. No.: 15/384,186

(22) Filed: Dec. 19, 2016

(65) Prior Publication Data
US 2017/0097999 A1  Apr. 6, 2017

Related U.S. Application Data

(63) Continuation of application No. PCT/JP2014/066486, filed on Jun. 20, 2014.

(51) Int. Cl.
G06F 16/951 (2019.01)
G06F 16/957 (2019.01)

(52) U.S. Cl.
CPC .......... *G06F 16/951* (2019.01); *G06F 16/957* (2019.01)

(58) Field of Classification Search
CPC ........ G06F 17/30864; G06F 17/30899; G06F 16/951; G06F 16/957
USPC ...................................................... 707/706
See application file for complete search history.

(56) References Cited

U.S. PATENT DOCUMENTS

2006/0200480 A1  9/2006  Harris et al.
2011/0241447 A1  10/2011  Ando et al.

FOREIGN PATENT DOCUMENTS

| JP | H11-154195 A | 6/1999 |
| JP | 2002-175365 A | 6/2002 |
| JP | 2005-228066 A | 8/2005 |
| JP | 2006-221490 A | 8/2006 |
| JP | 2007-148931 A | 6/2007 |
| JP | 2010-015314 A | 1/2010 |
| JP | 2011-229359 A | 11/2011 |

OTHER PUBLICATIONS

Form PCT/ISA/237 for PCT/JP2014/066486 and Partial Translation thereof.
The Office Action for JP application No. 2016-528764 and Partial Translation thereof.
Search Report dated Dec. 4, 2017, for corresponding EP Patent Application No. 14895141.1.

*Primary Examiner* — Joshua Bullock
(74) *Attorney, Agent, or Firm* — HEA Law PLLC

(57) ABSTRACT

Provided is an equipment information acquisition device, comprising at least one processor configured to: acquire, from a management system which stores inquiry information relating to each of a plurality of inquiry systems which manage their own equipment information corresponding to a model of electronic equipment independently, the inquiry information; acquire model-associated information relating to the model; acquire, based on a determination result of whether the model indicated by the model-associated information exists in a list relating to models which are managed by the inquiry system indicated by the inquiry information, the equipment information from the inquiry system indicated by the inquiry information; and display the equipment information on a display.

13 Claims, 11 Drawing Sheets

FIG.4

```
<model List>
<Listversion>0</Listversion>
<item @model ="ABCIS-.....00.+">
       <name>ABCIS</name>
       <contents @bade="http://xxx.com/ABCIS-.....00.+>
       </contents>
       <Contentsversion>0</Contentsversion>
</item>
</item @model ="ABCIS-.....10.+">
                    .
                    .
                    .
                    .
                    .
```

EQUIPMENT INFORMATION ACQUISITION DEVICE, EQUIPMENT INFORMATION ACQUISITION SYSTEM, EQUIPMENT INFORMATION ACQUISITION METHOD, AND INFORMATION STORAGE MEDIUM

CROSS-REFERENCE TO RELATED APPLICATION

The present disclosure contains subject matter related to that disclosed in International Patent Application PCT/JP2014/066486 filed in the Japan Patent Office on Jun. 20, 2014, the entire contents of which are hereby incorporated by reference.

BACKGROUND OF THE INVENTION

Field of the Invention

The embodiments disclosed herein relates to an equipment information acquisition device, an equipment information acquisition system, an equipment information acquisition method, a program, and an information storage medium.

Description of the Related Art

In JP2011-229359A, there is described a system in which a user connects a computer to electronic equipment and the computer displays various types of information on the electronic equipment in order to carry out maintenance work for the electronic equipment.

SUMMARY OF THE INVENTION

According to one embodiment of the present invention, there is provided an equipment information acquisition device, comprising at least one processor configured to: acquire, from a management system which stores inquiry information relating to each of a plurality of inquiry systems which manage their own equipment information corresponding to a model of electronic equipment independently, the inquiry information; acquire model-associated information relating to the model; acquire, based on a determination result of whether the model indicated by the model-associated information exists in a list relating to models which are managed by the inquiry system indicated by the inquiry information, the equipment information from the inquiry system indicated by the inquiry information; and display the equipment information on a display.

BRIEF DESCRIPTION OF THE DRAWINGS

FIG. 4 is a diagram for illustrating a data storage example of a list.

DESCRIPTION OF THE EMBODIMENTS

According to a point of view of the inventor of the present invention, hitherto, in order to acquire equipment information on electronic equipment, a user needs to find out a system for storing the equipment information, and to further find out desired equipment information from among various pieces of equipment information stored in the system, which takes time and effort.

As a result of extensive research and development of the acquisition of the equipment information on a desired electronic equipment from an appropriate system, the inventor of the present invention has conceived a novel and original equipment information acquisition device and the like. In the following, a detailed description is given of the equipment information acquisition device and the like by way of an embodiment.

[Equipment Information Acquisition System According to Embodiment of Present Invention]

Figure 1:
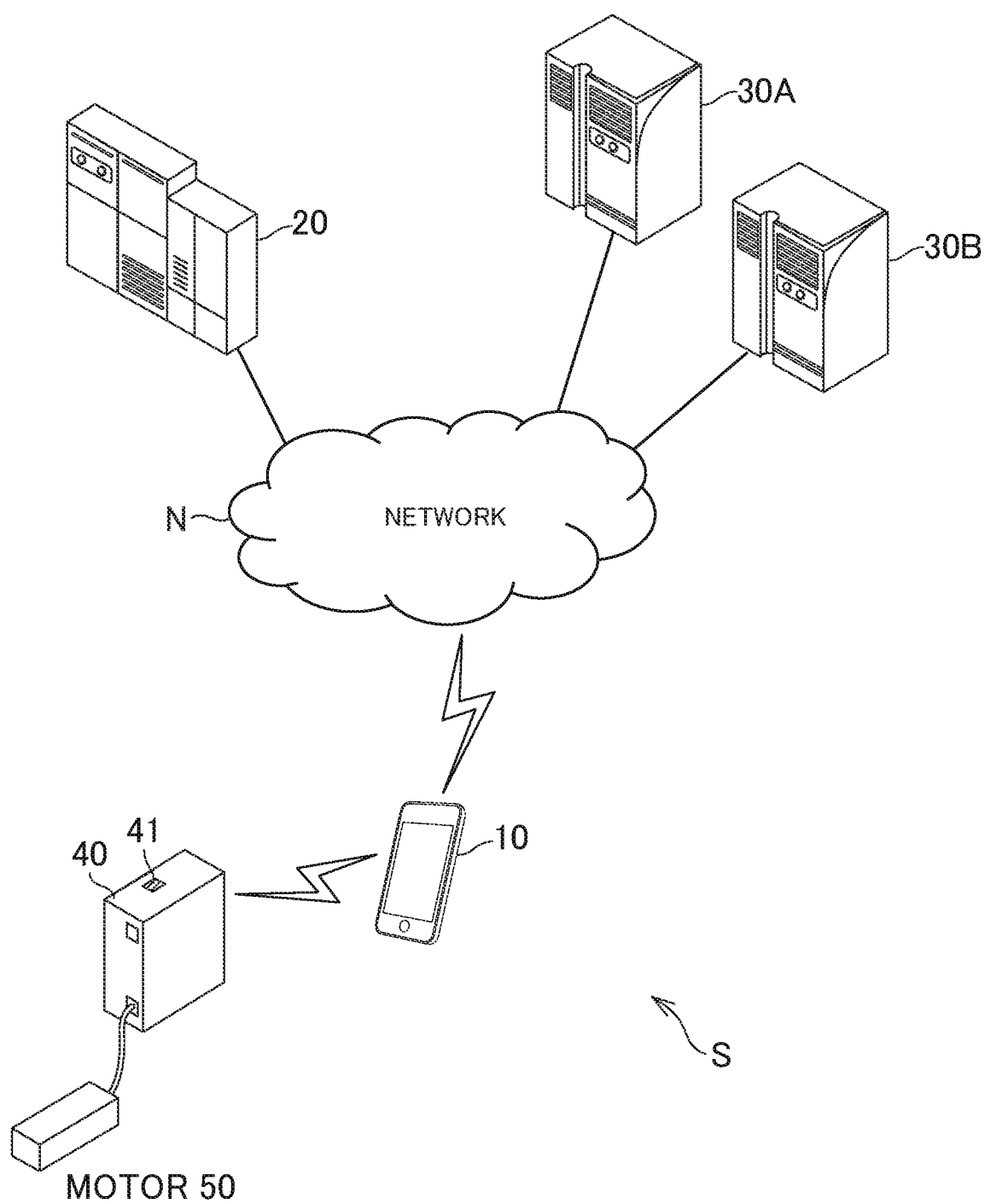
FIG. 1 is a diagram for illustrating an example of an overall configuration of an equipment information acquisition system according to an embodiment of the present invention.

FIG. 1 is a diagram for illustrating an example of an overall configuration of an equipment information acquisition system according to an embodiment of the present invention. As illustrated in FIG. 1, an equipment information acquisition system S according to this embodiment includes an equipment information acquisition device 10, a management system 20, and an inquiry system 30. The equipment information acquisition device 10, the management system 20, and the inquiry system 30 are connected to one another so as to be capable of transmitting/receiving data via a network N.

According to this embodiment, a description is given of a motor control device 40 as an example of the electronic equipment, but other various types of electronic equipment can be employed as the electronic equipment. For example, the electronic equipment may be an industrial equipment, e.g., a controller and an inverter, or a general electronic equipment, e.g., a personal computer and a smartphone. Therefore, the expression of "motor control device 40" in the following description can be replaced by various electronic equipment.

Figure 2:
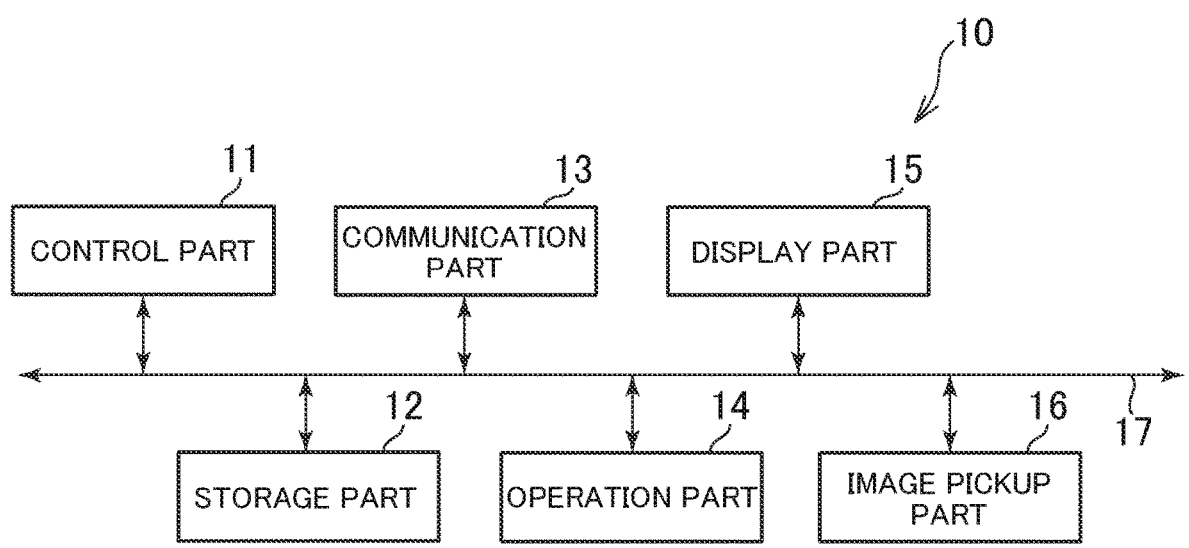
FIG. 2 is a diagram for illustrating an example of a hardware configuration of an equipment information acquisition device.

FIG. 2 is a diagram for illustrating an example of a hardware configuration of the equipment information acquisition device 10. The equipment information acquisition device 10 is a general computer, and is, for example, a portable terminal or a personal computer. The equipment information acquisition device 10 includes a control part 11, a storage part 12, a communication part 13, an operation part 14, a display part 15, and an image pickup part 16, and those parts are connected to one another via a bus 17.

The control part 11 includes one or a plurality of central processing units (CPUs). The storage part 12 includes a main storage part (e.g., volatile memory such as a DRAM) and an auxiliary storage part (e.g., nonvolatile memory such as a hard disk), and is configured to store various programs and data. The control part 11 is configured to carry out various pieces of processing based on those programs and data. The communication part 13 includes a network card and various communication connectors, and is configured to communicate to/from other devices. The operation part 14 is an input device, e.g., a mouse and a keyboard. The display part 15 is a liquid crystal display, an organic EL display, and the like, and is configured to display various types of screens in accordance with an instruction of the control part 11. The image pickup part 16 includes a camera, and is configured to take an image in accordance with an operation of the user. For example, the equipment information acquisition device 10 is used to carry out a maintenance operation for the motor control device 40 for controlling a motor 50.

The motor control device 40 includes a control part (e.g., micro processing unit (MPU)), and a storage part (e.g., DRAM and EEPROM), and is configured to store setting information such as parameters and firmware for controlling the motor 50. According to this embodiment, a two-dimensional code 41 including a serial number, which is individual identification information, is assigned to the motor control device 40. For example, the two-dimensional code 41 may be printed on a housing of the motor control device 40, or a recording medium (e.g., paper) on which the two-dimensional code 41 is printed may be attached to the housing. The equipment information acquisition device 10 can apply image analysis to the two-dimensional code 41 imaged by the image pickup part 16, thereby identifying the serial number and the like, which are the individual identification information on the motor control device 40.

The management system 20 includes a general server computer. The server computer includes a control part, a storage part, and a communication part, and those parts are connected to one another via a bus. Those hardware configurations may be the same as those of the equipment information acquisition device 10 (the image pickup part 16 may be omitted). The management system 20 is configured to manage personal information on each user and various pieces of information on the electronic equipment. The management system 20 provides those pieces of information in response to a request from the outside.

The inquiry system 30 includes a general server computer. The server computer includes a control part, a storage part, and a communication part, and those parts are connected to one another via a bus. Those hardware configurations may be the same as those of the equipment information acquisition device 10 (the image pickup part 16 may be omitted). According to this embodiment, electronic equipment produced by a maker are available for supply in a plurality of regions, and the inquiry system 30 exists for each of the regions. The term "supply" means both charged supply (e.g., sale), and free supply (e.g., replacement). On this occasion, electronic equipment available for supply vary depending on the region. In other words, a lineup of electronic equipment available for supply differs depending on the region. For example, electronic equipment available for supply in a country A may not be available for supply in a country B due to a restriction by law, need of customers, and the like.

Each of the plurality of inquiry systems 30 manages various pieces of information on electronic equipment that are available for supply in a region corresponding to the inquiry system 30 among electronic equipment available for supply from the maker. For example, an inquiry system 30A in the country A manages the equipment information on electronic equipment available for supply in the country A, and an inquiry system 30B in the country B manages the equipment information on electronic equipment available for supply in the country B. The equipment information is information on the electronic equipment, and the information on this occasion is not used solely by the computer internally, but is displayed on an appropriate display or is printed on paper so as to be visually comprehensible by the human. The equipment information contains character strings and images, and is, for example, a document such as a manual and maintenance information for an industrial equipment. The equipment information is described in a language in the region corresponding to the inquiry system 30.

Each of the inquiry systems 30 only needs to have a management body different from those of the other inquiry systems 30, and the server computer does not always need to be installed in the region corresponding to the inquiry system 30. In other words, for example, the server computers for the inquiry systems 30A and 30B may be installed in the same region. In this case, the inquiry system 30A only needs to be placed under the management of a management body of the country A, and the inquiry system 30B only needs to be placed under the management of a management body of the country B.

Moreover, the programs and the respective pieces of data described as being stored in the storage parts of the above-mentioned respective computers may be stored in computer-readable information storage media, or may be acquired from an external device via the network. Further, the hardware configuration of each of the computers is not limited to the above-mentioned example, and hardware generally used may be applied. For example, each of the computers may include a reading part for reading the information storage medium.

[Functions Implemented by Equipment Information Acquisition System]

Figure 3:
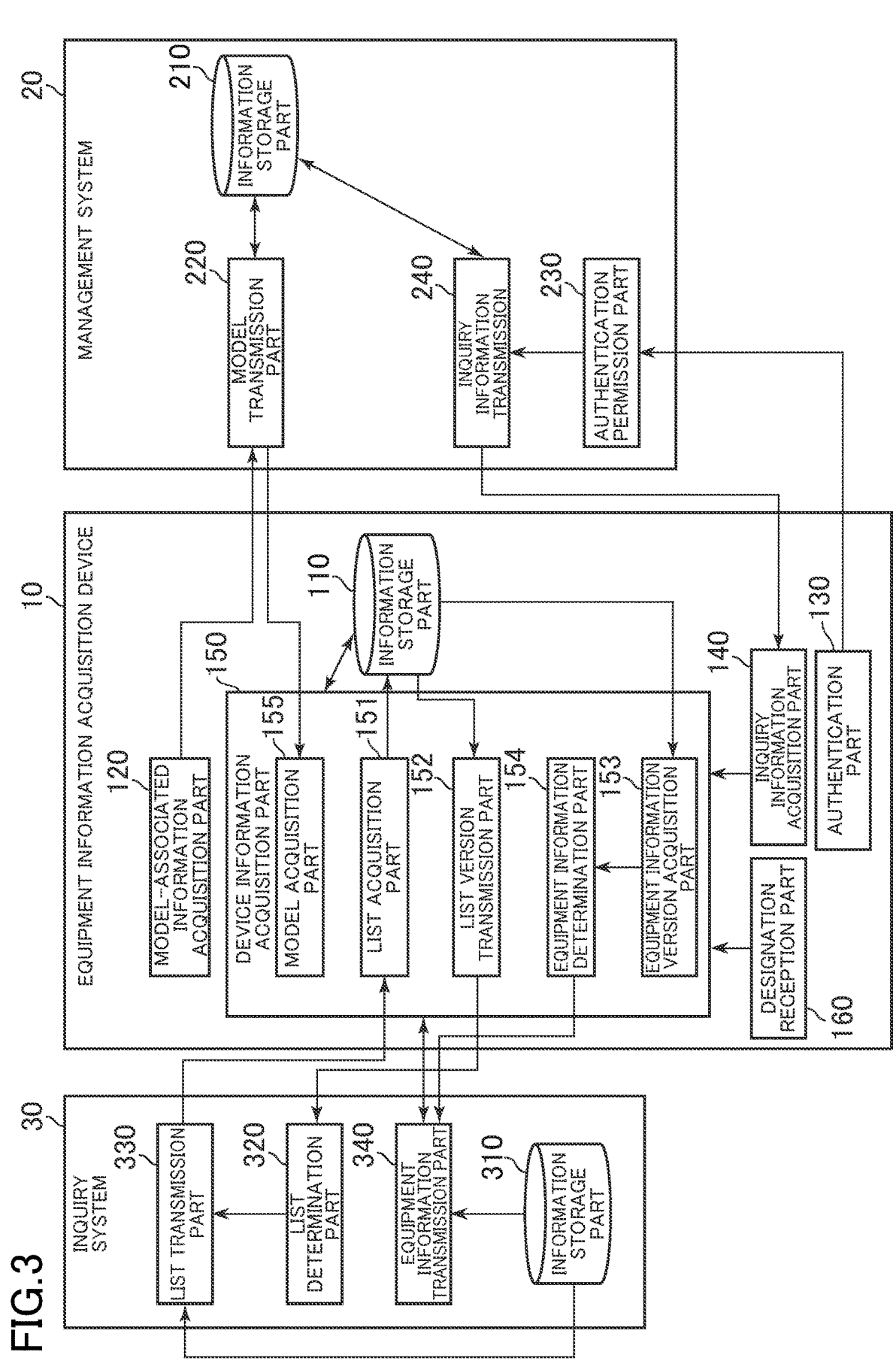
FIG. 3 is a functional block diagram for illustrating functions implemented in the embodiment of the present invention.

FIG. 3 is a functional block diagram for illustrating functions implemented in this embodiment.

[Functions Implemented by Inquiry System]

The inquiry system 30 includes an information storage part 310, a list determination part 320, a list transmission part 330, and an equipment information transmission part 340.

The information storage part 310 is implemented mainly by the storage part of the inquiry system 30. The information storage part 310 is configured to store various types of information on the electronic equipment available for supply in the region corresponding to the inquiry system 30. A description is now given of a list and equipment information as examples of the information stored in the information storage part 310.

FIG. 4 is a diagram for illustrating a data storage example of the list. As illustrated in FIG. 4, the list stores various types of information in a list form in association with models of the electronic equipment. On this occasion, the model is information indicating a type of the electronic equipment, and is represented by, for example, a symbol sequence of characters and numbers. On this occasion, the type represents a classification for grouping together electronic equipment common in handling, that is, common in an operation and maintenance work. On this occasion, the models in a list stored in the information storage part 310 of a certain inquiry system 30 are models of the electronic equipment available for supply in the region corresponding to the inquiry system 30 for managing the list.

According to this embodiment, the model in the list is described in the regular expression. The regular expression is a method of using one character string to express a set of character strings. As the regular expression itself, publicly known various expressions can be applied. On this occasion, the model and a location (e.g., URL) of the equipment information are associated with each other in the list. The location is a storage location of the equipment information. Further, version information representing newness of the list is associated with the list. When a content of the list is updated, the version information is also updated. The version information of the list may be integrated with the data of the list, or may be independent of the data of the list. A data format of the list may be various data formats, e.g., an extensible markup language (XML) format.

The equipment information is stored at a location indicated by the list within a storage region of the inquiry system 30. On this occasion, version information representing newness of the equipment information is also associated with the equipment information. The version information on the equipment information is also updated along with update of the content of the equipment information. The version information on each piece of the equipment information may be integrated with the equipment information, or may be independent of the equipment information. The version information on each piece of the equipment information may be associated with the list.

The list determination part 320 is implemented mainly by the control part of the inquiry system 30. The list determination part 320 is configured to determine which of the list in the inquiry system 30 and the list held by the equipment information acquisition device 10 is newer. On this occasion, the list determination part 320 compares the version information associated with the list in the inquiry system 30 and the version information associated with the list in the equipment information acquisition device 10 with each other.

The list determination part 330 is implemented mainly by the control part of the inquiry system 30. The list transmission part 330 is configured to transmit the list to the equipment information acquisition device 10. According to this embodiment, when the list transmission part 330 determines that the list in the inquiry system 30 is newer than the list in the equipment information acquisition device 10, the list transmission part 330 transmits the own list to the equipment information acquisition device 10.

The equipment information transmission part 340 is implemented mainly by the control part of the inquiry system 30. The equipment information transmission part 340 is configured to transmit the equipment information to the equipment information acquisition device 10. On this occasion, when the equipment information transmission part 340 determines that the equipment information in the inquiry system 30 is newer than the equipment information held by the equipment information acquisition device 10, the equipment information transmission part 340 transmits the own equipment information to the equipment information acquisition device 10.

[Functions Implemented by Equipment Information Acquisition Device]

The equipment information acquisition device 10 includes an information storage part 110, a model-associated information acquisition part 120, an authentication part 130, an inquiry information acquisition part 140, an equipment information acquisition part 150, and a designation reception part 160.

The information storage part 110 is implemented mainly by the storage part 12. The information storage part 110 is configured to store various types of information on the motor control device 40. For example, the information storage part 110 is configured to store the equipment information acquired by the equipment information acquisition part 150 described later and the list acquired by a list acquisition part 151. The version information is also associated with the equipment information and the list stored in the information storage part 110 as described above. According to this embodiment, regarding the equipment information, the equipment information itself is not stored in the list, but only the location of the equipment information is stored. Therefore, only equipment information acquired from the inquiry system 30 by the equipment information acquisition part 150 described later from among the equipment information managed by the inquiry system 30 is stored in the information storage part 110.

The model-associated information acquisition part 120 is implemented mainly by the control part 11. The model-associated information acquisition part 120 is configured to acquire model-associated information on the model of the motor control device 40. The model-associated information is information indicating the model of the motor control device 40 or information (information associated with the model) for identifying this information. According to this embodiment, the model can be identified based on the serial number, which is the individual identification information on the motor control device 40, and thus the serial number corresponds to the model-associated information.

Moreover, according to this embodiment, the model-associated information acquisition part 120 is configured to acquire the model-associated information included in the two-dimensional code 41. The model-associated information acquisition part 120 is configured to apply the image analysis to the two-dimensional code 41 imaged by the image pickup part 16, thereby acquiring the model-associated information included in the two-dimensional code 41. Publicly known various methods can be employed as the method of analyzing the two-dimensional code 41.

The authentication part 130 is implemented mainly by the control part 11. The authentication part 130 is configured to transmit a user ID and a password input by the user to the management system 20, and acquire an authentication result from the management system 20. The authentication method is not limited to the method of using the user ID and the password, and publicly known various methods can be employed as the authentication method.

The inquiry information acquisition part 140 is implemented mainly by the control part 11. The inquiry information acquisition part 140 is configured to acquire inquiry information from the management system 20 for storing inquiry information for identifying the inquiry information 30 for storing the equipment information on the motor control device 40. The inquiry information is information that can identify the inquiry system 30, and is, for example, information (e.g., URL and IP address) for identifying the location of the inquiry system 30 on the network N.

According to this embodiment, the inquiry information acquisition part 140 is configured to acquire inquiry information corresponding to user information on the user, more specifically, information (hereinafter referred to as assigned group information) indicating an assigned group of the user included in the user information, from the management system 20. On this occasion, the inquiry information acquisition part 140 acquires the inquiry information transmitted by the inquiry information transmission part 240 (described in detail later).

The equipment information acquisition part 150 is implemented mainly by the control part 11. The equipment information acquisition part 150 is configured to acquire the equipment information from the inquiry system 30 indicated by the inquiry information based on the inquiry information and the model-associated information. The equipment information acquisition part 150 is configured to acquire the equipment information determined based on the model-associated information from among the equipment information managed by the inquiry system 30. On this occasion, the inquiry system 30 indicated by the inquiry information manages the electronic equipment available for supply in the assigned region of the user, and thus the equipment information acquisition part 150 acquires the equipment information on the electronic equipment available for supply.

According to this embodiment, the equipment information acquisition part 150 includes the list acquisition part 151 configured to acquire a list relating to the models from the inquiry system 30, and is configured to acquire the equipment information based on the list and the model-associated information. Moreover, the equipment information acquisition part 150 includes a list version transmission part 152 configured to transmit the version information of the list stored in the information storage part 110. When a list that can be acquired from the inquiry system 30 is newer than the previously acquired list, the list acquisition part 151 acquires the newer list from the inquiry system 30.

Moreover, the equipment information acquisition part 150 includes an equipment information version acquisition part 153 configured to acquire the version information on the equipment information. Further, the equipment information acquisition part 150 includes an equipment information determination part 154 configured to determine which of the equipment information in the inquiry system 30 and the equipment information in the equipment information acquisition device 10 is newer. On this occasion, the equipment information determination part 154 compares the version information (that is, the version information acquired by the equipment information acquisition part 150) in the inquiry system 30 and the version information associated with the equipment information in the equipment information acquisition device 10 with each other. When the equipment information (that is, the equipment information in the inquiry system 30) that can be acquired based on the newer list is determined to be newer than the previously acquired equipment information (that is, the equipment information stored in the information storage part 110), the equipment information acquisition part 150 acquires the new equipment information from the inquiry system 30.

Moreover, on this occasion, the equipment information acquisition part 150 includes a model acquisition part 155 configured to acquire the model of the industrial equipment from the management system 20 based on the individual identification information (e.g., serial number). The equipment information acquisition part 150 is configured to acquire the equipment information associated with the model acquired by the model acquisition part 155. For example, the equipment information acquisition part 150 acquires the equipment information based on the list in which the model is described in the regular expression. In other words, the equipment information acquisition part 150 uses the regular expression in the list to search for a model matching the model acquired by the model acquisition part 155, to thereby acquire the equipment information associated with the matching model.

The designation reception part 160 is implemented mainly by the control part 11 and the operation part 14. The designation reception part 160 is configured to receive designation by the user from among the models indicated by the list. In other words, the designation reception part 160 receives designation of any of the plurality of models in the list. In this case, the equipment information acquisition part 150 acquires the equipment information based on the model designated by the user. In other words, the equipment information acquisition part 150 acquires the equipment information associated with the model designated by the user.

[Functions Implemented by Management System]

The management system 20 includes an information storage part 210, a model transmission part 220, an authentication permission part 230, and the inquiry information transmission part 240.

The information storage part 210 is implemented mainly by the storage part of the management system 20. The information storage part 210 is configured to store various types of information on the electronic equipment and various types of information on the user. For example, the information storage part 210 stores associations between the serial number and the model. Moreover, for example, the information storage part 210 stores associations between the user ID and the assigned group information, and associations between the assigned group information and the inquiry information. In addition, for example, the information storage part 210 stores the authentication information and the user information.

The authentication information is information necessary for the user to log in to the management system 20, and is information necessary for authenticating the user. On this occasion, a combination of a user ID and a password of each of the users corresponds to the authentication information.

The user information includes the assigned group information on the user, that is, information indicating an assigned group of the user. On this occasion, the assigned group is information indicating an attribute of the user, and is information indicating, for example, a region to which the user belongs (region in which a sales company of the electronic equipment exists), an organization, e.g., a company, and a section thereof, to which the user belongs. The user information may include personal information such as the user ID and a user name as well as the assigned group information.

The model transmission part 220 is implemented mainly by the control part of the management system 20. The model transmission part 220 is configured to transmit the model associated with the serial number acquired from the model-associated information acquisition part 120.

The authentication permission part 230 is implemented mainly by the control part of the management system 20. The authentication permission part 230 is configured to carry out authentication processing of authenticating the user. On this occasion, the authentication permission part 230 compares the user ID and the password acquired from the authentication part 130 of the equipment information acquisition device 10 and a user ID and a password stored in the information storage part 110 with each other for the authentication.

The inquiry information transmission part 240 is implemented mainly by the control part of the management system 20. The inquiry information transmission part 240 is configured to transmit the inquiry information determined based on the assigned group information on the user included in the user information. On this occasion, the inquiry information transmission part 240 identifies the inquiry information to be transmitted based on the assigned group information associated with the user ID. In other words, the inquiry information transmission part 240 transmits the inquiry information associated with the assigned group information.

[Processing Carried Out in Equipment Information Acquisition System]

Figure 5:
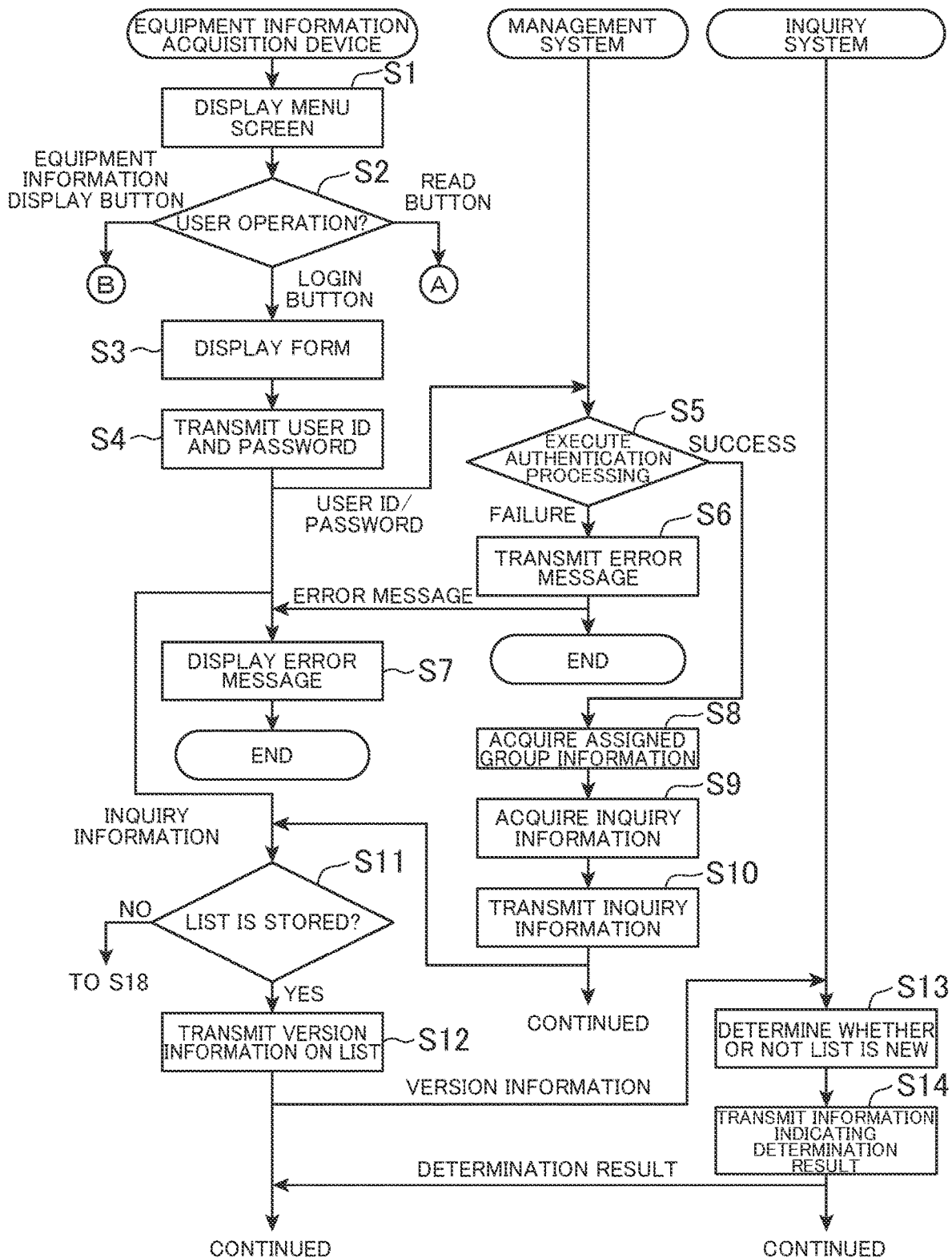
FIG. 5 is a flowchart for illustrating an example of processing carried out by the equipment information acquisition system.
Figure 6:
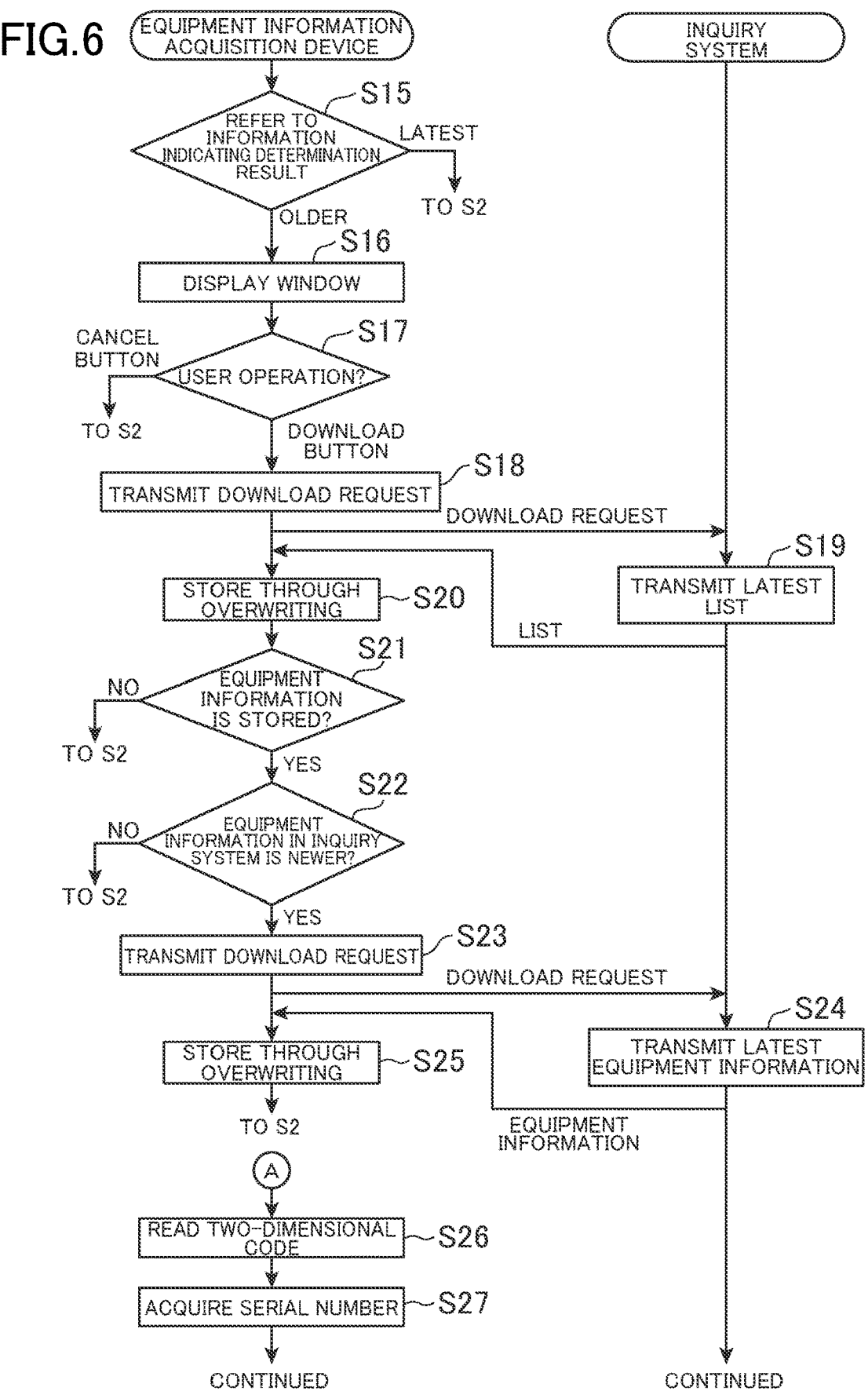
FIG. 6 is a flowchart for illustrating an example of processing carried out by the equipment information acquisition system.
Figure 7:
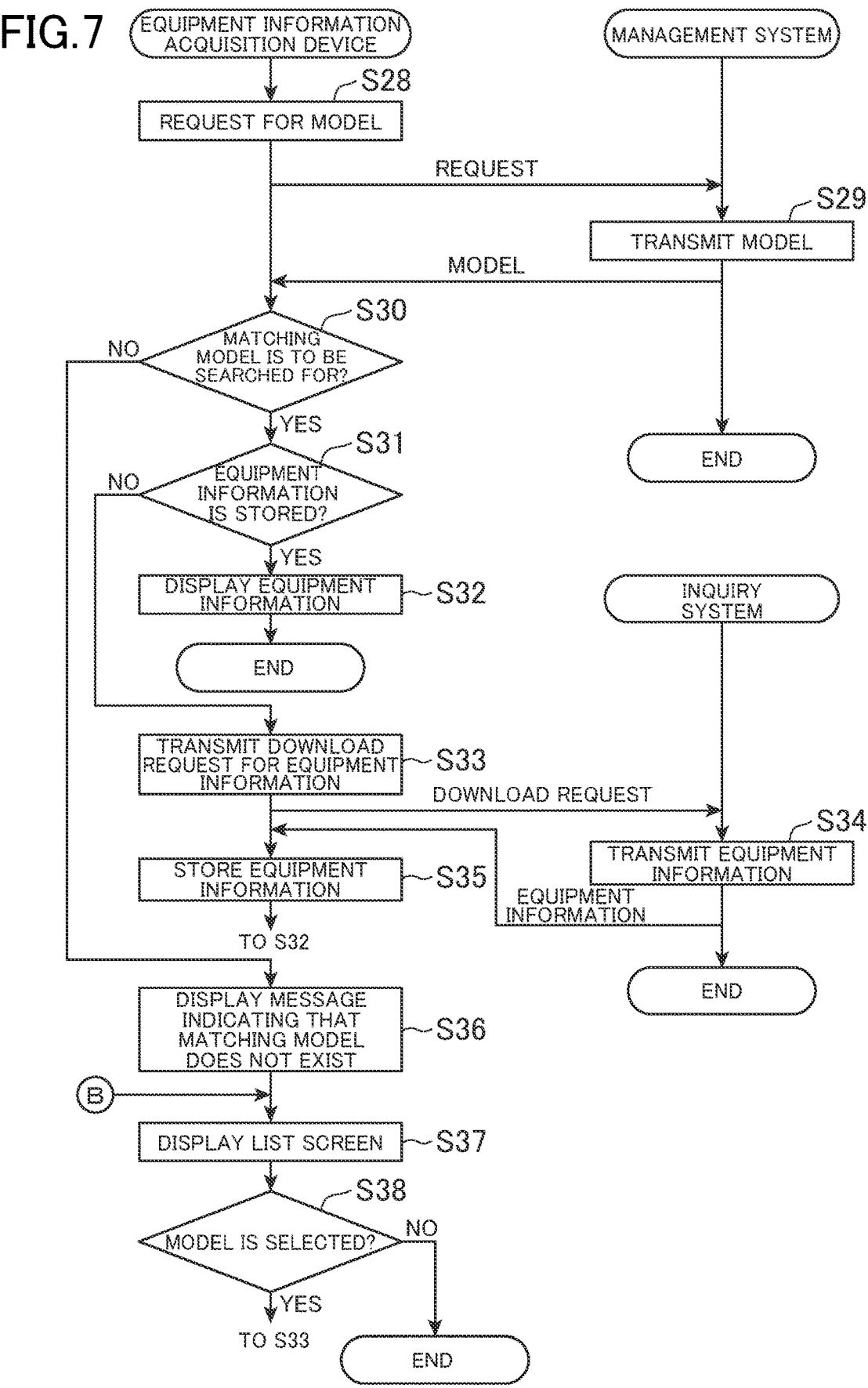
FIG. 7 is a flowchart for illustrating an example of processing carried out by the equipment information acquisition system.

FIG. 5 to FIG. 7 are diagrams for illustrating an example of processing carried out by the equipment information acquisition system S. The processing described below is carried out by the equipment information acquisition device 10, the management system 20, and the inquiry system 30 respectively executing programs. The respective functional blocks are implemented by carrying out this processing.

Figure 8:
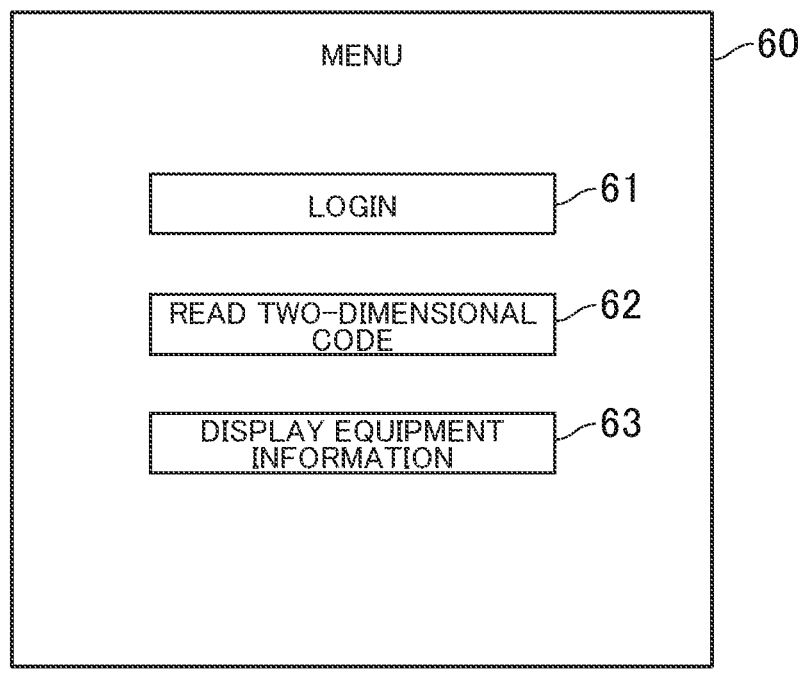
FIG. 8 is a diagram for illustrating an example of a menu screen.

As illustrated in FIG. 5, first, the control part 11 of the equipment information acquisition device 10 starts an application stored in the storage part 12 to display a menu screen on the display part 15 (S1). FIG. 8 is a diagram for illustrating an example of the menu screen. As illustrated in FIG. 8, a menu screen 60 is a screen for the user to use services provided by the management system 20. For example, a login button 61 for logging in to the management system 20, a read button 62 for reading the two-dimensional code 41, and an equipment information display button 63 for displaying the equipment information are displayed on the menu screen 60.

The control part 11 of the equipment information acquisition device 10 waits for an operation of the user from the operation part 14 (S2). When the user selects the login button 61 ("login button" in S2), the control part 11 of the equipment information acquisition device 10 displays a form for inputting the user ID and the password on the display part 15 (S3), and transmits the user ID and the password input by the user from the operation part 14 to the management system 20 (S4).

When the control part of the management system 20 receives the user ID and the password, the control part carries out the authentication processing (S5). In Step S5, the management system 20 first determines whether or not the user ID input by the user exists in the storage part. When the user ID exists in the storage part, the control part of the management system 20 determines whether or not the password associated with this user ID and the password input by the user match each other.

When the authentication fails ("failure" in S5), the control part of the management system 20 transmits an error message indicating that the authentication has failed to the equipment information acquisition device 10 (S6). When the control part 11 of the equipment information acquisition device 10 receives the error message, the control part displays the error message on the display part 15 (S7), and this processing is finished. On the other hand, when the authentication is successful ("success" in S5), the control part of the management system 20 acquires the assigned group information associated with the user ID from the storage part of the management system 20 (S8).

The control part of the management system 20 acquires the inquiry information associated with the assigned group information acquired in Step S8 from the storage part of the management system 20 (S9). The control part of the management system 20 transmits the inquiry information acquired in Step S9 to the equipment information acquisition device 10 (S10). The IP address, the URL, and the like of the inquiry system 30 are stored in the inquiry information.

When the control part 11 of the equipment information acquisition device 10 receives the inquiry information, the control part 11 refers to the storage part 12, thereby determining whether or not the list is stored (S11). When the list is determined not to be stored in the storage part 12 ("N" in S11), the control part 11 of the equipment information acquisition device 10 proceeds to processing of Step S18 described later, and acquires the list from the inquiry system 30.

On the other hand, when the list is determined to be stored in the storage part 12 ("Y" in S11), the control part 11 of the equipment information acquisition device 10 transmits the version information on the list stored in the storage part 12 to the inquiry system 30 indicated by the inquiry information (S12).

When the control part of the inquiry system 30 receives the version information on the list, the control part determines whether or not the list in the inquiry system 30 is newer than the list in the equipment information acquisition device 10 (S13). The inquiry system 30 transmits information indicating a determination result of Step S13 to the equipment information acquisition device 10 (S14). The information indicating the determination result indicates that the list in the equipment information acquisition device 10 is latest, or the list in the inquiry system 30 is newer.

Referring to FIG. 6, the control part 11 of the equipment information acquisition device 10 refers to the information indicating the determination result received from the inquiry system 30 (S15). When the list in the equipment information acquisition device 10 is latest ("latest" in S15), the control part 11 of the equipment information acquisition device 10 returns to the processing of Step S2.

Figure 9:
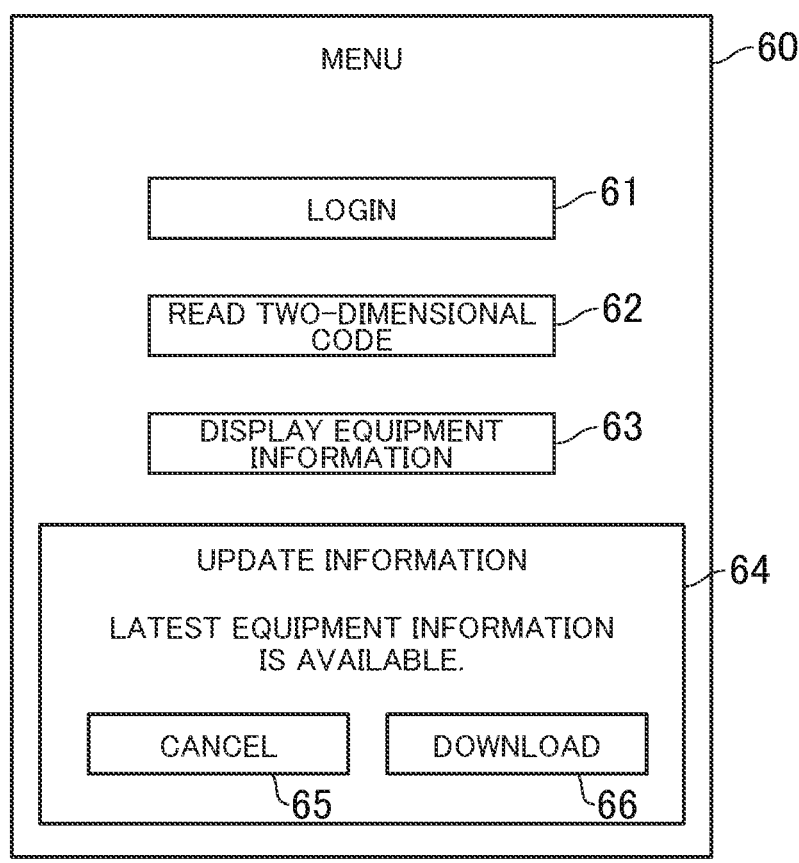
FIG. 9 is a diagram for illustrating a window displayed on a display part of the equipment information acquisition device.

On the other hand, when the list in the inquiry system 30 is newer ("older" in S15), the control part 11 of the equipment information acquisition device 10 displays on the display part 15 a window for asking whether or not the list in the inquiry system 30 is to be downloaded (S16). FIG. 9 is a diagram for illustrating the window displayed in Step S16. As illustrated in FIG. 9, a window 64 including a cancel button 65 for continuing the operation without downloading the latest list and a download button 66 for downloading the latest list are displayed on the display part 15 together with a message for asking whether or not the latest list is to be downloaded.

The control part 11 of the equipment information acquisition device 10 waits for an operation of the user from the operation part 14 (S17). When the cancel button 65 is selected ("cancel button" in S17), the control part 11 of the equipment information acquisition device 10 returns to the processing of Step S2.

On the other hand, when the download button 66 is selected ("download button" in S17), the control part 11 of the equipment information acquisition device 10 transmits a download request for the latest list to the inquiry system 30 (S18). When the control part of the inquiry system 30 receives the download request, the control part transmits the latest list to the equipment information acquisition device 10 (S19). When the control part 11 of the equipment information acquisition device 10 receives the latest list, the control part 11 stores the latest list in the storage part 12 through overwriting with the latest list (S20).

The control part 11 of the equipment information acquisition device 10 determines whether or not the equipment information is stored in the storage part 12 (S21). When the equipment information is not stored in the storage part 12

("N" in S21), the control part 11 of the equipment information acquisition device 10 returns to the processing of Step S2.

On the other hand, when the equipment information is stored in the storage part 12 ("Y" in S21), the control part 11 of the equipment information acquisition device 10 compares the version information on the equipment information stored in the storage part 12 and the version information on the equipment information in the list with each other, thereby determining whether or not the equipment information in the inquiry system 30 is newer than the equipment information in the equipment information acquisition device 10 (S22). On this occasion, it is assumed that the version information on each piece of the equipment information in the list is associated with the list. When the equipment information in the inquiry system 30 is not determined to be newer ("N" in S22), the control part 11 of the equipment information acquisition device 10 returns to the processing of Step S2.

On the other hand, when the equipment information in the inquiry system 30 is determined to be newer ("Y" in S22), the control part 11 of the equipment information acquisition device 10 transmits a download request for the latest equipment information to the inquiry system 30 (S23). When the control part of the inquiry system 30 receives the download request, the control part transmits the equipment information stored in the storage part of the inquiry system 30 to the equipment information acquisition device 10 (S24). When the control part 11 of the equipment information acquisition device 10 receives the latest equipment information, the control part 11 stores the latest equipment information in the storage part 12 through overwriting with the latest equipment information (S25), and returns to the processing of Step S2. In this way, the latest list and equipment information are stored in the storage part 12 of the equipment information acquisition device 10.

On the other hand, in Step S2, when the user selects the read button 62 ("read button" in S2), the control part 11 of the equipment information acquisition device 10 activates the image pickup part 16, thereby reading the two-dimensional code 41 of the motor control device 40 (S26). When the user has not logged in, the control part 11 of the equipment information acquisition device 10 may proceed to the processing to Step S3.

The control part 11 of the equipment information acquisition device 10 acquires the serial number of the motor control device 40 based on the read two-dimensional code 41 (S27). Referring to FIG. 7, the control part 11 of the equipment information acquisition device 10 requests the model of the motor control device 40 together with the serial number from the management system 20 (S28).

When the control part of the management system 20 receives the request, the control part reads the model associated with the serial number from the storage part of the management system 20, and transmits the model to the equipment information acquisition device 10 (S29). When the control part 11 of the equipment information acquisition device 10 receives the model, the control part uses the regular expression in the list to search for the matching model (S30).

When a matching model exists ("Y" in S30), the control part 11 of the equipment information acquisition device 10 determines whether or not the equipment information on the matching model is stored in the storage part 12 (S31). In other words, in Step S31, the control part 11 determines whether or not the equipment information on the matching model has been downloaded. When the equipment information is determined to be stored in the storage part 12 ("Y" in S31), the control part 11 of the equipment information acquisition device 10 displays the equipment information on the display part 15 (S32), and this processing is finished.

On the other hand, when the equipment information is determined not to be stored in the storage part 12 ("N" in S31), the control part 11 of the equipment information acquisition device 10 transmits the download request for the equipment information on the matching model to the inquiry system 30 (S33). In Step S33, the control part 11 transmits a request to make access to the location (e.g., URL) associated with the matching model.

The control part of the inquiry system 30 reads the requested equipment information from the storage part of the inquiry system 30, and transmits the equipment information to the equipment information acquisition device 10 (S34). When the control part 11 of the equipment information acquisition device 10 receives the equipment information, the control part 11 stores the equipment information in the storage part 12 (S35), and proceeds to the processing of Step S32.

On the other hand, when a matching model does not exist ("N" in S30), the control part 11 of the equipment information acquisition device 10 displays a message indicating that a matching model does not exist (S36). Then, the control part 11 may proceed to the processing of Step S37.

On the other hand, in Step S2, when the equipment information display button 63 is selected ("equipment information display button" in S2), the control part 11 of the equipment information acquisition device 10 displays a list screen on the display part 15 based on the list stored in the storage part 12 (S37). The models in the list are displayed for selection on the list screen. When the user has not logged in, the control part 11 of the equipment information acquisition device 10 may proceed to the processing of Step S3. The control part 11 of the equipment information acquisition device 10 determines whether or not the user has selected the model displayed on the list screen based on a signal from the operation part 14 (S38). When a model is determined to be selected ("Y" in S38), the control part 11 proceeds to the processing of Step S31.

With the above-mentioned equipment information acquisition device 10, the equipment information on a desired electronic equipment can be acquired from the appropriate inquiry system 30. Moreover, in terms of the entire equipment information acquisition system S, time and effort for managing the equipment information on the management system 20 side can be eliminated by managing the equipment information on the electric equipment on the inquiry system 30 side. As a result, the roles can be shared between the management system 20 and the inquiry system 30. For example, the user information and basic information on the electric equipment can be centrally managed in the management system 20, and the equipment information corresponding to the inquiry systems 30 can be managed in each of the inquiry systems 30. Therefore, time and effort for carrying out maintenance work for each of the systems can be decreased.

Moreover, the equipment information acquisition device 10 acquires the inquiry information corresponding to the user information, and thus the inquiry can be controlled for each user. As a result, the equipment information acquisition device 10 can acquire the equipment information from the optimal inquiry system corresponding to the user. In particular, the equipment information acquisition device 10 acquires the inquiry information corresponding to the assigned group of the user, and thus the inquiry can be controlled for each assigned group of users. As a result, the equipment information acquisition device 10 can acquire the equipment information from the optimal inquiry system 30 corresponding to the assigned group of the user. Further, the equipment information acquisition system S acquires the inquiry information corresponding to the assigned region of the user, and thus the inquiry can be controlled for each assigned region of the user. The equipment information can also be managed for each region, and thus the equipment information can easily be provided in a language corresponding to the region.

Moreover, when the equipment information on an industrial equipment is provided, there is such a problem specific to the industrial equipment that restrictions are often imposed on the industrial equipment by regional regulations and the like unlike the general electric equipment, and the equipment information, e.g., a manual, needs to be produced in detail for each region. Therefore, when the industrial equipment is supplied across a plurality of regions, the management cost for the equipment information greatly increases compared with the management cost for the equipment information on the general electronic equipment. In this respect, with the equipment information acquisition system S, the equipment information on the industrial equipment is not centrally managed, but can be distributed to management bodies for the respective inquiry systems 30. Thus, the equipment information can easily be managed, and an overall management cost can be decreased consequently.

Moreover, the equipment information acquisition device 10 can use the list to acquire the equipment information. The number of times of communication can be decreased by carrying out the search for the location of the equipment information on the equipment information acquisition device 10 side compared with a case where this search is carried out by the inquiry system 30. Further, the equipment information acquisition device 10 can use the list to search for the equipment information, and thus the inquiry system 30 only needs to maintain the list, resulting in a small load imposed by the information processing. This means that search logic does not need to be implemented on the inquiry system 30 side, and a system cost can thus be decreased. Further, when the inquiry system 30 carries out the search, such a state that none is hit in the search and no information is thus acquired occurs. However, the equipment information acquisition device 10 can acquire at least the list, and thus the state where no information is acquired can be avoided.

Moreover, the equipment information acquisition device 10 can also acquire the equipment information based on the model designated by the user from among the models included in the list, and when a matching model does not exist in the list, the equipment information on the model designated by the user can be acquired. Therefore, such a state where the user can acquire no information can be avoided. Moreover, even when the user does not have the actual electronic equipment at hand, the user can acquire necessary information based on the model.

Moreover, the information acquisition device 10 acquires the list when the list in the inquiry system 30 is newer, and useless communication can thus be avoided compared with a case where the list is acquired from the inquiry system 30 each time an application starts. Further, the equipment information acquisition device 10 can also search for the equipment information based on the latest list. Moreover, the equipment information acquisition device 10 can decrease a period until the equipment information is displayed compared with the case where the list is acquired from the inquiry system 30 each time the application starts.

Moreover, the information acquisition device 10 acquires the equipment information when the equipment information on the inquiry system 30 is newer, and useless communication can thus be avoided compared with a case where the equipment information is acquired from the inquiry system 30 each time the two-dimensional code 41 is read. Further, the equipment information acquisition device 10 can acquire the latest equipment information. Moreover, the equipment information acquisition device 10 can decrease a period until the equipment information is displayed compared with the case where the equipment information is acquired from the inquiry system 30 each time the two-dimensional code 41 is read.

Moreover, the search logic can be simplified by using the regular expression to search for the equipment information in the equipment information acquisition device 10. Further, complicated search logic does not need to be built on the inquiry system 30 side, and the maintenance cost on the inquiry system 30 side can thus be decreased. Further, a data amount of the list can be decreased by using the regular expression.

Moreover, the model can be acquired from the management system 20 by acquiring the individual identification information, e.g., the serial number, on the equipment information acquisition device 10 side. As a result, the individual identification information and the models can be centrally managed by the management system 20. Moreover, the equipment information acquisition device 10 can use the two-dimensional code 41 to acquire the model-associated information, and the model-associated information can thus relatively easily be acquired.

Modified Examples

In the embodiment, a description has been given of the case where the equipment information acquisition device 10 is configured to search for the equipment information, but the search processing may be carried out on the inquiry system 30 side. In this case, the equipment information acquisition part 150 requests the inquiry system 30 to search for the equipment information to be acquired. For example, the equipment information acquisition part 150 transmits a search request for the equipment information together with the model to the inquiry system 30.

In a modified example of the present invention configured in this manner, when the equipment information transmission part 340 receives the search request from the equipment information acquisition device 10, the equipment information transmission part 340 searches for the equipment information based on the model. A search method itself for the equipment information is the same as the method described in the embodiment. In other words, also in the modified example, the equipment information transmission part 340 may use the regular expression described in the list to search for the matching model, and transmit the equipment information associated with the model determined to match.

With the modified example, the inquiry system 30 carries out the search for the equipment information, and thus the processing load on the equipment information acquisition device 10 side is decreased.

Moreover, for example, a description has been given of the case where the determination processing for the version information on the list is carried out by the inquiry system 30, but the determination processing may be carried out by the equipment information acquisition device 10 side. FIG.

Figure 10:
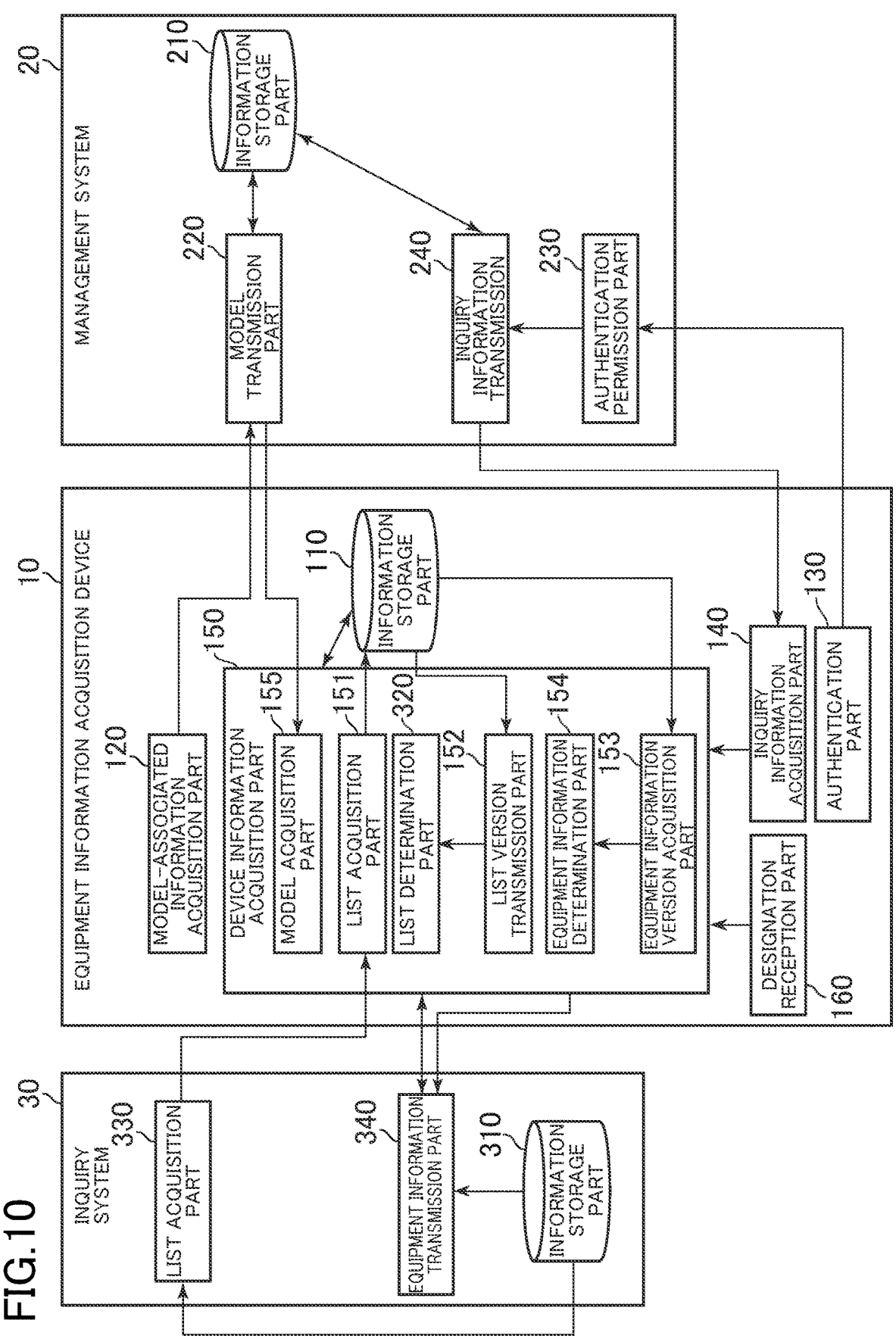
FIG. 10 is a functional block diagram for illustrating functions implemented in a modified example of the present invention.

10 is a functional block diagram of another modified example of the present invention. As illustrated in FIG. 10, the equipment information acquisition part 150 of the equipment information acquisition device 10 includes the list determination part 320, and the list determination part 320 is implemented mainly by the control part 11 of the equipment information acquisition device 10. The determination method of the list determination part 320 is the same as the method described in the embodiment, but the inquiry system 30 transmits the version information on the list in the inquiry system 30 to the equipment information acquisition device 10. The list determination part 320 carries out the determination processing based on the version information acquired from the inquiries system 30.

Figure 11:
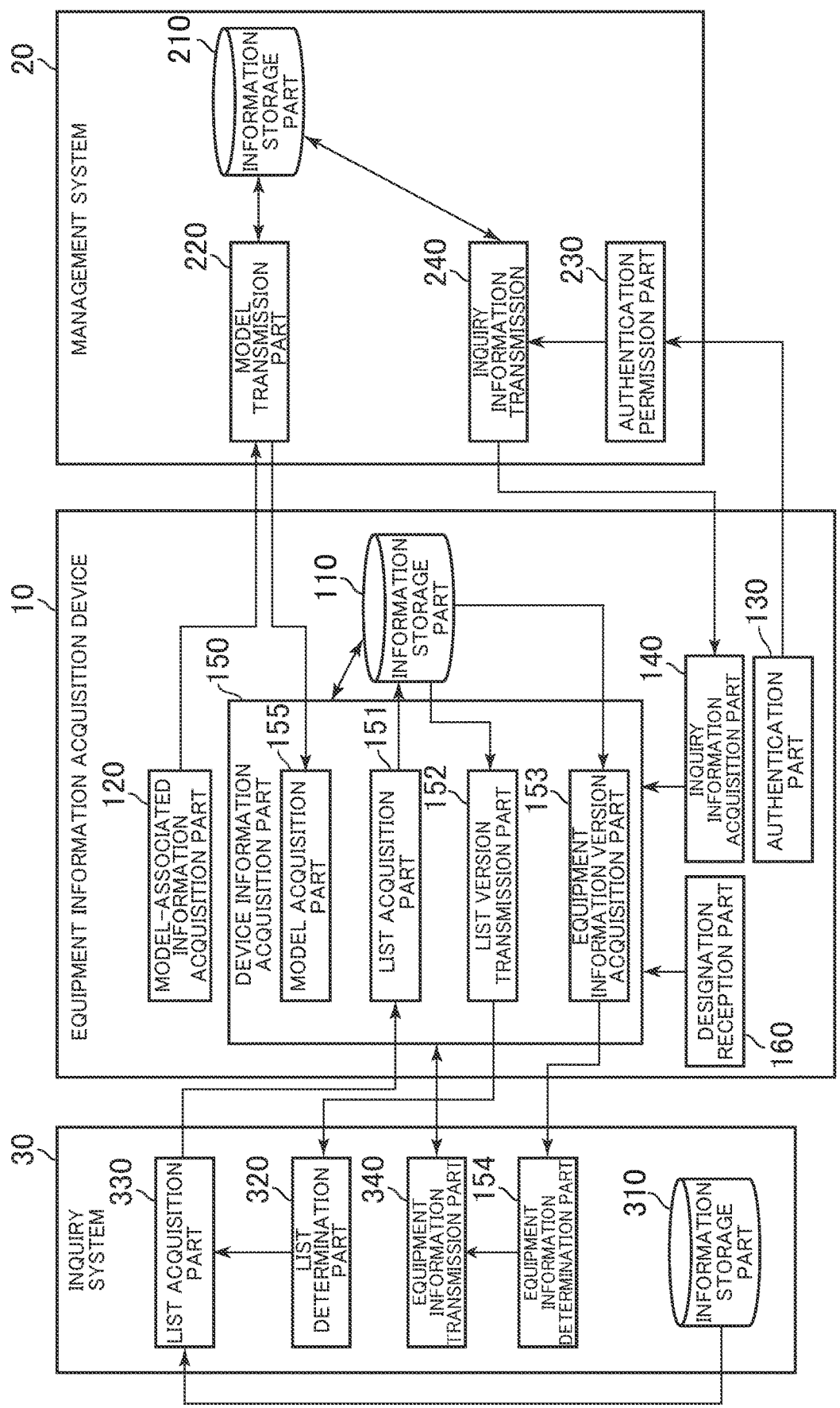
FIG. 11 is a functional block diagram for illustrating functions implemented in another modified example of the present invention.

Moreover, for example, a description has been given of the case where the determination processing for the version information on the equipment information is carried out by the equipment information acquisition device 10, but the determination processing may be carried out on the inquiry system 30 side. FIG. 11 is a functional block diagram of still another modified example of the present invention. In this case, the inquiry system 30 includes the equipment information determination part 154, and the equipment information determination part 154 is implemented mainly by the control part of the inquiry system 30. The determination method of the equipment information determination part 154 is the same as the method described in the embodiment, but the equipment information version acquisition part 153 transmits the version information on the equipment information stored in the information storage part 110 to the inquiry system 30. The equipment information determination part 154 acquires the transmitted version information, and carries out the determination processing.

Moreover, a description has been given of the case where the model-associated information is the serial number, but the model-associated information may be information indicating the model itself. In this case, the model of the industrial equipment can be identified on the equipment information acquisition device 10 side. As a result, the inquiry for identifying the model does not need to be requested to be carried out by another system, and the number of times of communication can thus be decreased.

Moreover, when the state of the login to the management system 20 is maintained, the processing may proceed to the processing of Step S11 when the menu screen 60 is displayed. In this case, it is assumed that the inquiry information is stored in the storage part 12, and the equipment information acquisition device 10 can identify the inquiry system 30.

Moreover, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

What is claimed is:

1. An equipment information acquisition system configured to communicate with inquiry systems, where each region has any one of the inquiry systems and, supply models of electronic equipment depend on each of the regions and the inquiry systems manage their own equipment information corresponding to the supply models in their own regions independently;
the equipment information acquisition system comprising:
a management system which stores inquiry information relating to each of the inquiry systems, and
at least one processor configured to:
acquire the inquiry information of user's region from the management system;
acquire model-associated information relating to a model;
acquire, based on a determination result of whether the model indicated by the model-associated information exists in a supply list relating to the supply models of the user's region, the equipment information from the inquiry system of the user's region;
display the acquired equipment information on a display, and
wherein even if supply models of the user's region are same as supply models of other region, the acquired equipment information is different from the equipment information of the other region.

2. The equipment information acquisition system according to claim 1, wherein:
each of the inquiry systems stores the supply list relating to the supply models; and
the at least one processor:
acquires the supply list from the inquiry system of the user's region;
determines whether the model indicated by the model-associated information exists in the supply list; and
acquires the equipment information if it is determined that the model exists.

3. The equipment information acquisition system according to claim 2, wherein the at least one processor:
receives designation by a user from among models indicated by the list; and
acquires the equipment information based on the model designated by the user.

4. The equipment information acquisition system according to claim 2, wherein the at least one processor, if a supply list that is available from the inquiry system is determined to be newer than a previously acquired supply list, acquires the newer supply list from the inquiry system.

5. The equipment information acquisition system according to claim 4, wherein the at least one processor, if equipment information that is available based on the newer supply list is determined to be newer than previously acquired equipment information, acquires the newer equipment information from the inquiry system.

6. The equipment information acquisition system according to claim 2, wherein the at least one processor acquires the equipment information based on the supply list in which the model is described in a regular expression.

7. The equipment information acquisition system according to claim 1, wherein the at least one processor requests the inquiry system to determine whether the model exists in the supply list and transmit equipment information if it is determined that the model exists in the supply list.

8. The equipment information acquisition system according to claim 1, wherein the at least one processor:
acquires a supply list relating to the supply model from the inquiry system; and
acquires the equipment information based on the supply list and the model-associated information.

9. The equipment information acquisition system according to claim 1, wherein the model-associated information indicates the model.

10. The equipment information acquisition system according to claim 1, wherein the at least one processor acquires the model-associated information included in a two-dimensional code.

11. An equipment information acquisition system configured to communicate with inquiry systems, where each region has any one of the inquiry systems, supply models of electronic equipment depend on each of the regions, and the inquiry systems manage their own equipment information corresponding to the supply models of electronic equipment independently;

the equipment information acquisition system comprising:

a management system which stores inquiry information relating to each of the inquiry systems; and an equipment information acquisition device comprising at least one processor configured to:

acquire the inquiry information of user's region from the management system;

acquire model-associated information relating to a model;

acquire, based on a determination result of whether the model indicated by the model-associated information exists in a supply list relating to supply models of the user's region, the equipment information from the inquiry system of the user's region; and display the acquired equipment information on a display, wherein even if supply models of the user's region are same as supply models of other region, the acquired equipment information is different from the equipment information of the other region.

12. An equipment information acquisition method, where each region has any one of inquiry systems and supply models of electronic equipment depend on each of the regions and the inquiry systems manage their own equipment information corresponding to the supply models in their own region;

the method comprising:

acquiring model-associated information relating to a model;

acquiring, based on a determination result of whether the model indicated by the model-associated information exists in a supply list relating to the supply models of the user's region, the equipment information from the inquiry system of the user's region; and displaying the acquired equipment information on a display, wherein even if supply models of the user's region are same as supply models of other region, the acquired equipment information is different from the equipment information of the other region.

13. A non-transitory computer-readable information storage medium having a program where each region has any one of inquiry systems and where supply models of electronic equipment depend on each of the regions and where the inquiry systems manage their own equipment information corresponding to the supply models in their own regions, the program causing a computer to acquire model associated information relating to a model;

acquire, based on a determination result of whether the model indicated by the model-associated information exists in a supply list relating to the supply models of the user's region, the equipment information from the inquiry system of the user's region; and display the acquired equipment information or display, wherein even if supply models of the user's region are same as supply models of other region, the acquired equipment information is different from the equipment information of the other region.

\* \* \* \* \*